United States Patent
Kim et al.

(10) Patent No.: US 12,038,920 B2
(45) Date of Patent: Jul. 16, 2024

(54) SYSTEM AND METHOD FOR LSM COMPACTION

(71) Applicant: SK hynix Inc., Gyeonggi-do (KR)

(72) Inventors: Jongryool Kim, San Jose, CA (US); Hyung Jin Lim, San Jose, CA (US); Shiju Li, San Jose, CA (US); Kevin Tang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 70 days.

(21) Appl. No.: 18/079,355

(22) Filed: Dec. 12, 2022

(65) Prior Publication Data
US 2024/0193159 A1   Jun. 13, 2024

(51) Int. Cl.
G06F 16/242 (2019.01)
G06F 3/06 (2006.01)
G06F 16/21 (2019.01)
G06F 16/22 (2019.01)
G06F 16/25 (2019.01)

(52) U.S. Cl.
CPC .......... G06F 16/244 (2019.01); G06F 3/0608 (2013.01); G06F 3/0626 (2013.01); G06F 3/0652 (2013.01); G06F 3/0679 (2013.01); G06F 16/211 (2019.01); G06F 16/2246 (2019.01); G06F 16/252 (2019.01)

(58) Field of Classification Search
CPC .......... G06F 16/2264; G06F 11/1453; G06F 16/244; G06F 16/2246
USPC .......................................... 707/829
See application file for complete search history.

(56) References Cited

U.S. PATENT DOCUMENTS 10,445,022 B1    10/2019  Qui et al.
2018/0300205 A1*  10/2018  Sehgal ............... G06F 11/1451
2020/0183905 A1    6/2020  Wang et al.
2022/0129433 A1*  4/2022  Agrawal ............. G06F 16/2264

OTHER PUBLICATIONS

Nae Young Song et al, Efficient Key-Value Stores with Ranged Log-Structured Merge Trees, 2018 IEEE 11th International Conference on Cloud Computing (CLOUD), Jul. 2-7, 2018, IEEE, Accessible at DOI:10.1109/CLOUD.2018.00090.

* cited by examiner

Primary Examiner — Hung T Vy
(74) Attorney, Agent, or Firm — IP & T GROUP LLP

(57) ABSTRACT

In a compaction scheme for a log structured merge (LSM) tree, a storage device is configured to: receive a first user data piece from a host; generate a first meta data piece for a highest level of the LSM tree, corresponding to the first user data piece; when the highest level exceeds a set storage limit, trigger a compaction process on the first and second meta data pieces to generate compacted meta data pieces excluding overlapping meta data elements of the second meta data pieces overlapped with the first meta data piece. Through a garbage collection, victim user data elements corresponding to the overlapping meta data elements are deleted.

20 Claims, 12 Drawing Sheets

SYSTEM AND METHOD FOR LSM COMPACTION

BACKGROUND

1. Field

Embodiments of the present disclosure relate to a key-value storage system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

With the rapid development of Web 2.0 applications and cloud computing, large-scale distributed storage systems are widely deployed to support Internet-wide services. To store the ultra-large-scale data and service high-concurrent access, the use of traditional relational database management systems (RDBMS) as data storage may not be an efficient choice. A number of features and functionalities of RDBMS, such as transaction consistency guarantee and support of complicated SQL queries, are not necessary for many web applications. Therefore, a new storage architecture such as a key-value (KV) store has emerged in the era of big data. This storage architecture may have a data structure such as a log structured merge Tree (such as a LSM, B or B+ tree). In this context, embodiments of the present invention arise.

SUMMARY

Aspects of the present invention provide a key-value storage system and a compaction method for an LSM tree structure in a key-value storage system.

In one aspect of the present invention, a system includes a host; and a storage device including a plurality of memory blocks and coupled to the host. The storage device is configured to: receive a first user data piece from the host; store the first user data piece in a particular memory block among the plurality of memory blocks; generate a first meta data piece to be stored in a highest level among hierarchical levels of a log structured merge (LSM) tree, the first meta data piece corresponding to the first user data piece; when the highest level exceeds a set storage limit in response to determining of the first meta data piece, trigger a compaction process on the first meta data piece and second meta data pieces which have been stored in the highest level and a higher level to generate compacted meta data pieces, the second meta data pieces including overlapping meta data elements overlapped with the first meta data piece, the compacted meta data pieces excluding the overlapping meta data elements; store the compacted meta data pieces in the highest level; and perform a garbage collection on second user data pieces stored in the plurality of memory blocks to delete victim user data elements corresponding to the overlapping meta data elements, the second user data pieces corresponding to the second meta data pieces.

A method for operating a storage device including a plurality of memory blocks and coupled to a host, includes: receiving a first user data piece from the host; storing the first user data piece in a particular memory block among the plurality of memory blocks; generating a first meta data piece to be stored in a highest level among hierarchical levels of a log structured merge (LSM) tree, the first meta data piece corresponding to the first user data piece; when the highest level exceeds a set storage limit in response to determining of the first meta data piece, triggering a compaction process on the first meta data piece and second meta data pieces which have been stored in the highest level and a higher level to generate compacted meta data pieces, the second meta data pieces including overlapping meta data elements overlapped with the first meta data piece, the compacted meta data pieces excluding the overlapping meta data elements; storing the compacted meta data pieces in the highest level; and performing a garbage collection on second user data pieces stored in the plurality of memory blocks to delete victim user data elements corresponding to the overlapping meta data elements, the second user data pieces corresponding to the second meta data pieces.

Additional aspects of the present invention will become apparent from the following description.

DETAILED DESCRIPTION

Figure 1:
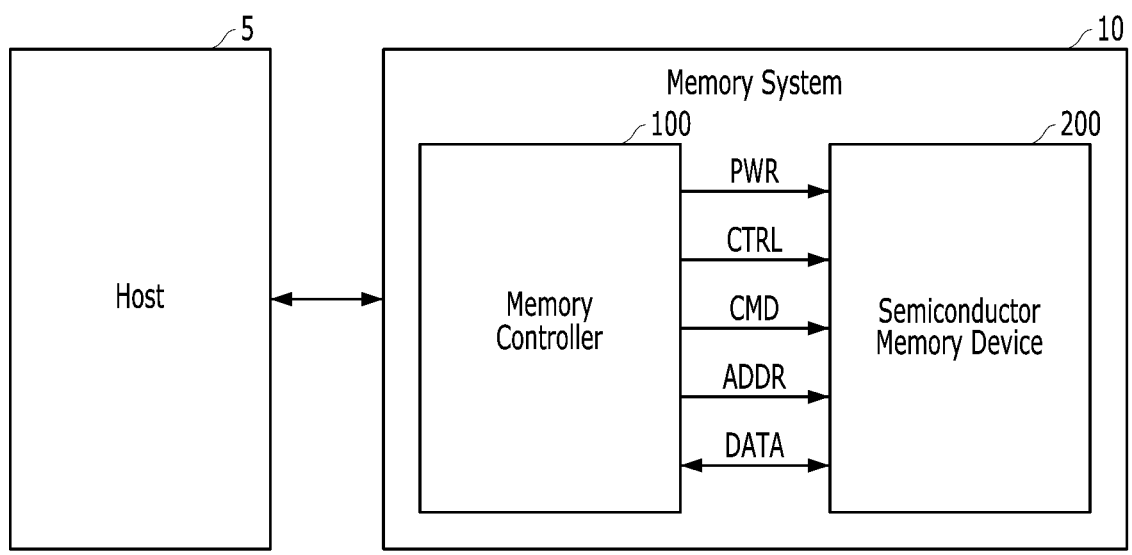
FIG. 1 is a block diagram illustrating a data processing system in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of the embodiments of the present invention is provided below along with accompanying figures that illustrate aspects of the present invention. The present invention is described in connection with such embodiments, but the present invention is not limited to any embodiment. The present invention encompasses numerous alternatives, modifications and equivalents within the scope of the disclosure. Numerous specific details are set forth in the following description in order to provide a thorough understanding of the present invention. These details are provided for the purpose of example; the present invention may be practiced according to the claims without some or all of these specific details. For clarity, technical material that is known in technical fields related to the present invention has not been described in detail so that the present invention is not unnecessarily obscured.

FIG. 1 is a block diagram illustrating a data processing system 2 in accordance with one embodiment of the present invention.

Referring FIG. 1, the data processing system 2 may include a host device 5 and a memory system 10. The memory system may receive a request from the host device 5 and operate in response to the received request. For example, the memory system may store data to be accessed by the host device 5.

The host device 5 may be implemented with any of various types of electronic devices. In various embodiments, the host device may include for example an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include for example a portable electronic device such as a mobile phone, a smart phone, an e-book, an MP3 player, a portable multimedia player (PMP), and/or a portable game player. In various embodiments, the host device 5 may include for example database, storage, filesystem, and distributed computing frameworks.

The memory system 10 may be implemented with any of various types of storage devices such as a solid state drive (SSD) and a memory card. In various embodiments, the memory system 10 may be provided as one of various components in an electronic device such as for example a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure for example a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
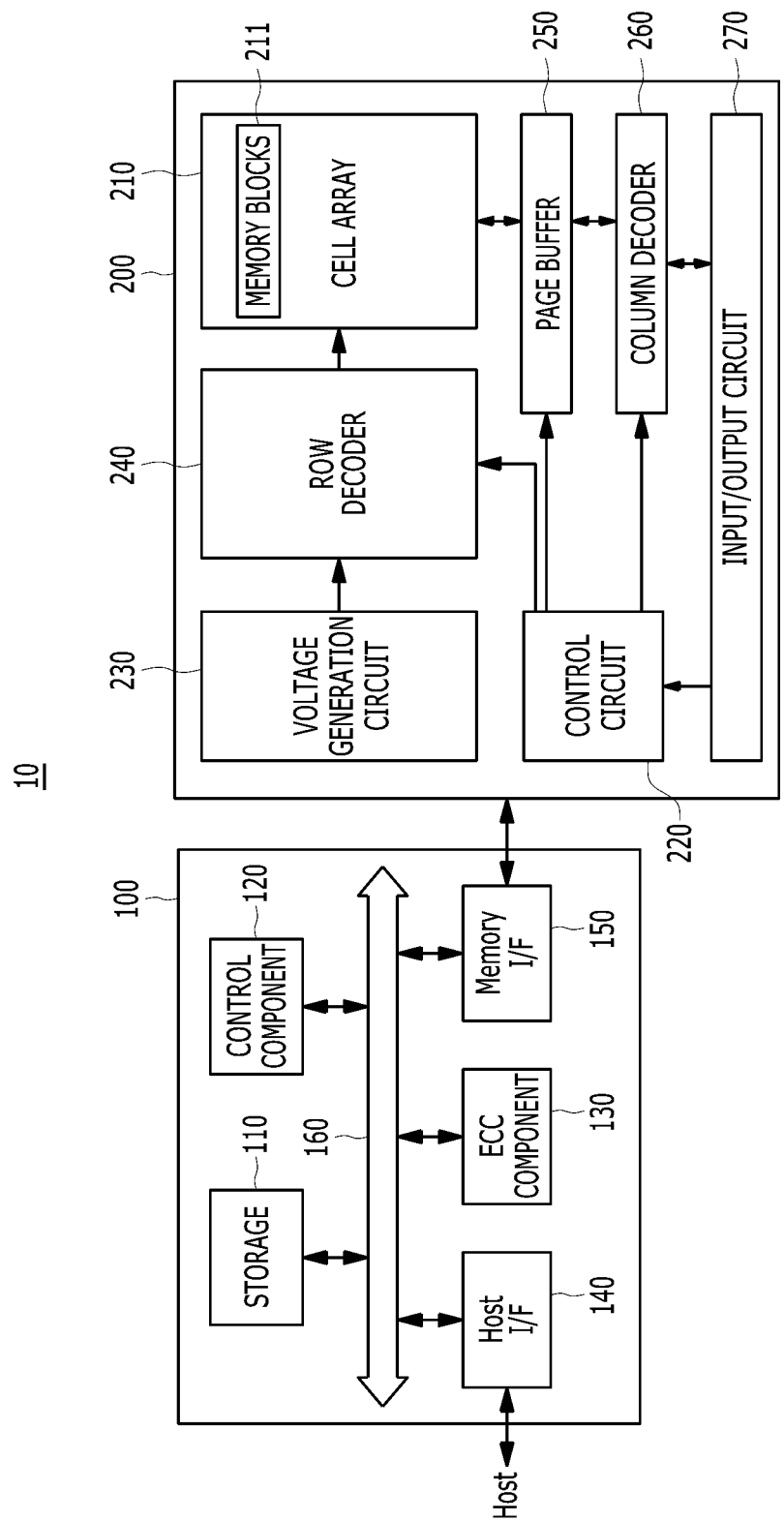
FIG. 2 is a block diagram illustrating a memory system in accordance with another embodiment of the present invention.

FIG. 2 is a block diagram illustrating a memory system in accordance with another embodiment of the present invention. For example, the memory system of FIG. 2 may depict the memory system shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as for example a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120 which may be implemented as a processor such as for example a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. The control component 120 may drive firmware (i.e., programmed instructions), which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as for example a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various communication standards or interfaces such as for example a universal serial bus (USB), a multimedia card (MMC), a peripheral component interconnect express (PCIe or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
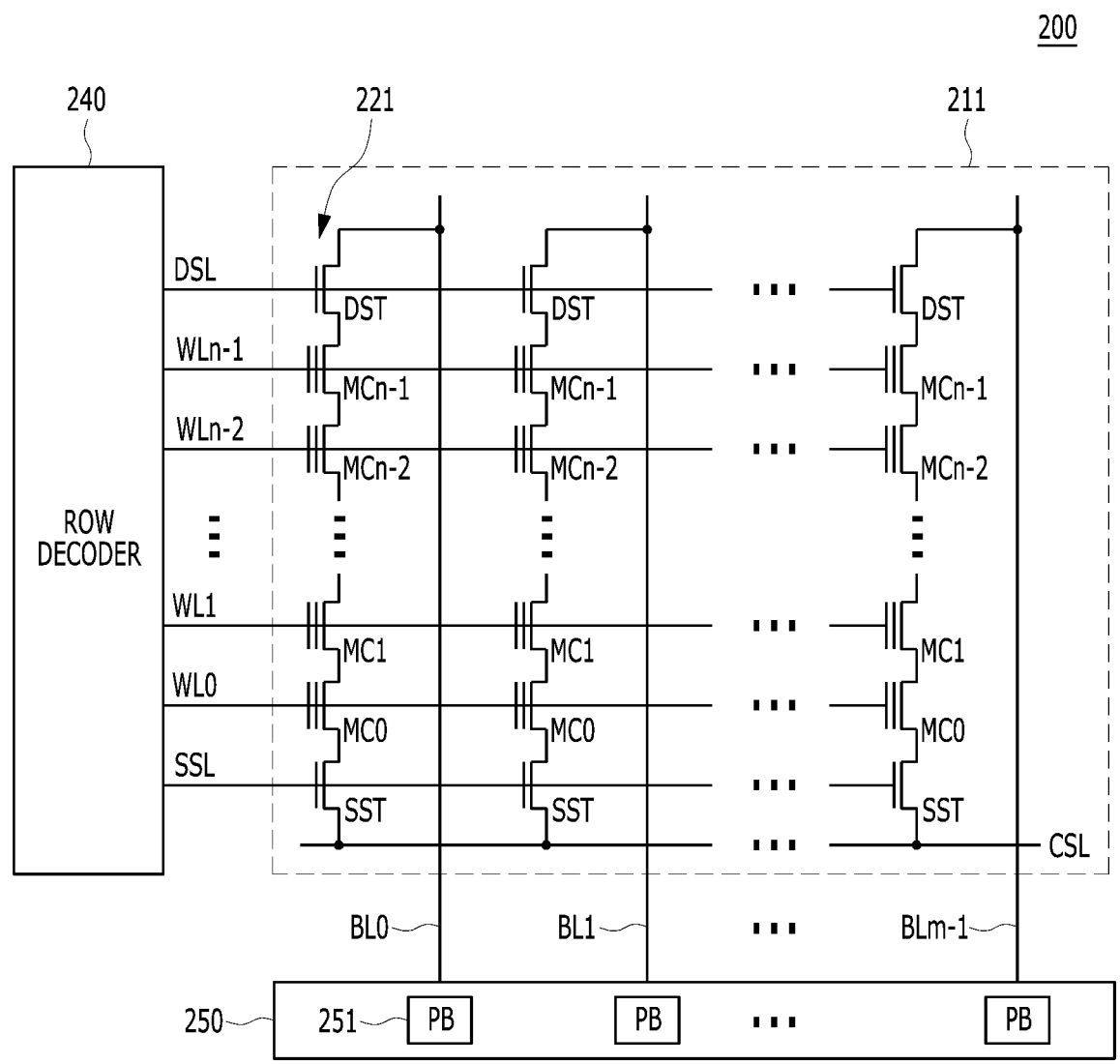
FIG. 3 is a circuit diagram illustrating a memory block of a memory device in accordance with yet another embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with another embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn-1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 may temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
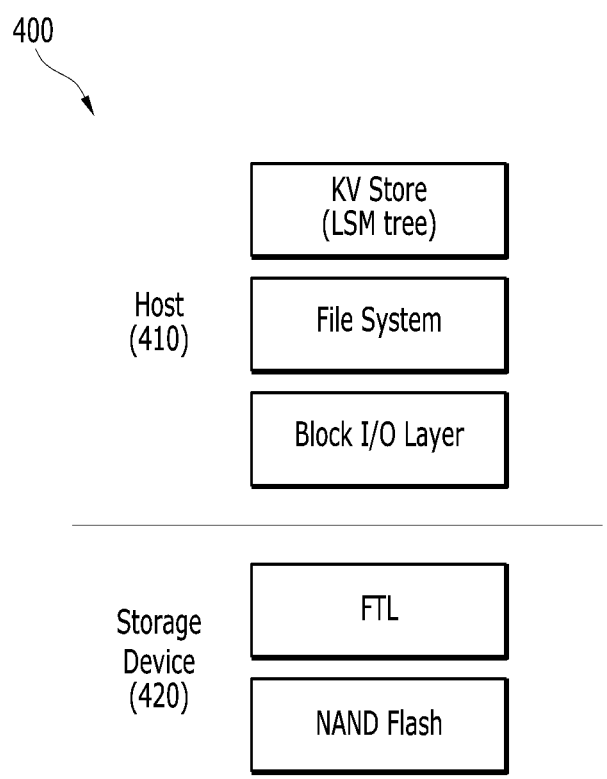
FIG. 4 is a diagram illustrating an architecture of a key-value storage system.

FIG. 4 is a diagram illustrating an architecture of a key-value storage system 400.

Referring to FIG. 4, the key-value storage system 400 may include a host device 410 and a storage device 420. The host device 410 and the storage device 420 may correspond to the host device 5 and the memory system 10 in FIG. 1, respectively. The storage device 420 may be implemented with a NAND flash solid state drive (SSD). For this implementation, the storage device 420 may include one or more NAND flash memory devices and a flash translation layer (FTL). FTL plays an important role in the management of NAND flash memory devices. In various implementations, FTL may run firmware algorithms (i.e., program instructions) for address remapping, garbage collection, I/O scheduling, wear leveling and bad block management. In addition, the storage device 420 may include various components, which are implemented in hardware and/or software. For example, the storage device 420 may include components as shown in FIG. 2.

The host device 410 may include a user space and a kernel space, which indicate software components of the host device 410 and/or the storage device 420. In various implementations, the user space may include application and standard libraries and the kernel space may include a file system and a block input/output (I/O) layer. In an implementation, the host device 410 may support a key-value (KV) store.

The key-value storage system (or database system) 400 may be a data storage paradigm designed for storing, retrieving, and managing associative arrays, and a data structure more commonly known today as a dictionary or hash table. Dictionaries may include a collection of objects or records, which in turn have many different fields within them, each containing data. These records may be stored and retrieved using a key that uniquely identifies the record, and is used to find the data within the database.

A key-value store is a database that manages key-value pairs. Due to its simple key-value interface to access the value using the key, the key-value store has been widely employed in many modern applications. For example, it can be used as a building block in applications, such as object stores in distributed object storage systems, database storage engines, and caching systems for bid data storage systems. It can also be directly employed as distributed or local key-value database systems. In particular, key-value stores such as for example Cassandra, RocksDB and LevelDB are implemented using a Log-Structured Merge Tree (LSM tree) on top of the OS file system, as shown in FIG. 4.

In various embodiments, the KV storage engine including LSM tree may be offloaded to the SSD. Thus, the SSD should handle the WAL, memTable, and SST for the LSM tree based storage engine.

Figure 5:
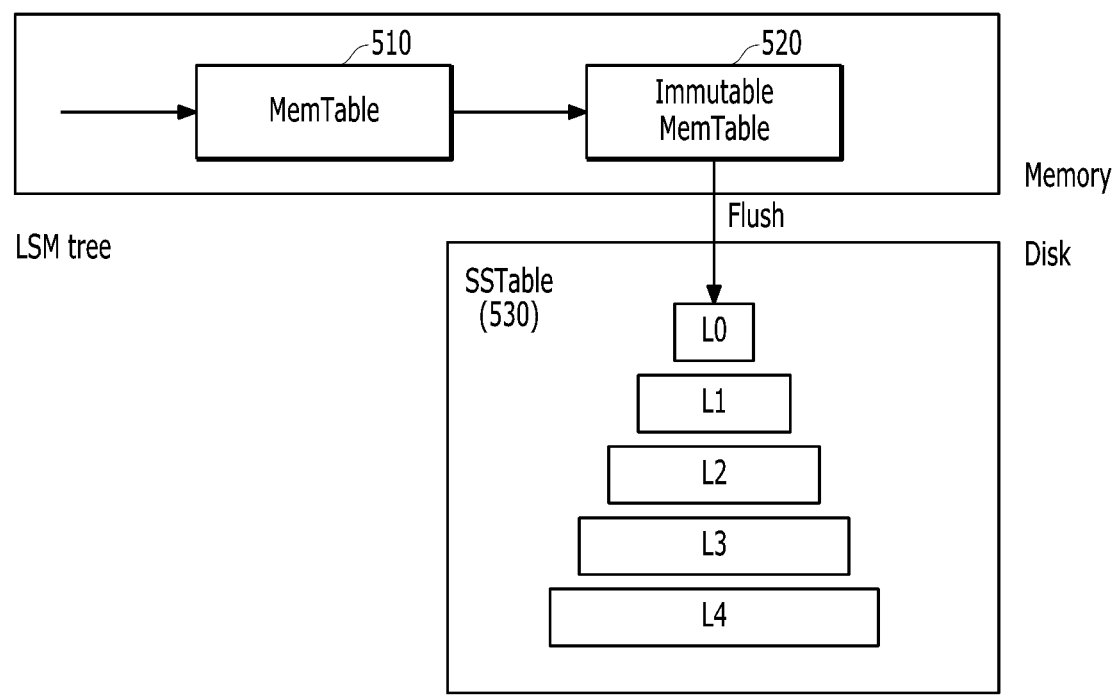
FIG. 5 is a diagram illustrating a key-value store using an LSM tree.

FIG. 5 is a diagram illustrating a key-value store using LSM tree. LSM tree is a data structure widely employed for the key-value store. LSM tree delivers high throughput under write-intensive workloads by generating sequential writes from user's input requests through buffering and batching.

Referring to FIG. 5, LSM tree may include two tables 510 and 520 in a main memory and a set of tables 530 in a disk as a persistent storage. The main memory may be a volatile memory in a host (e.g., a host 410 of FIG. 4). Alternatively, the main memory may be a volatile memory (e.g., a dynamic random access memory (DRAM)) in a storage device (e.g., a storage device 420 of FIG. 4). The disk may be a storage device 420 of FIG. 4 (e.g., SSD).

When the user inserts a key-value pair into a key-value store, the key-value pair may be first saved in a log file and then may be inserted into the first table 510, called MemTable. When the size of incoming data items reaches its full capacity, the first table 510 may be transformed into the second table 520, called a read-only Immutable MemTable. At the same time, a background thread may begin to dump (flush) the Immutable MemTable into the disk and generate a new sorted string table file (SSTable) 530.

An SSTable 530 may store a sequence of data items. A set of SSTables may be organized into a series of levels, e.g., L0 to L4 as shown in FIG. 5. The highest level L0 may be produced by writing the Immutable MemTable from the main memory to the disk. Each level has a limit on the maximum number of SSTables, or equivalently, on the total amount of data because each SSTable has a fixed size in each level. The limit grows at an exponential rate with the level number. For example, the maximum amount of data in the level L1 will not exceed 10 MB, and it will not exceed 100 MB for the level L2.

The user can retrieve the corresponding value of the key using a GET request. The key-value store using the LSM tree first searches the key in the MemTable 510. If successful, it returns the corresponding value. Otherwise, it will search for the corresponding value in SSTable 530.

In order to keep the stored data in an optimized layout, a compaction process may be conducted. The background compaction thread may monitor the SSTable files. Each level may have a threshold in size, and when the size reaches the threshold (e.g., 4 MB), it triggers the compaction process. When the compaction process is triggered, it selects a victim SSTable from the level L where the compaction process is triggered. Then the compaction process may merge the victim SSTable with SSTable having an overlapping key range in the next level (L+1) and may insert new SSTables to the next level (L+1). Since SSTables are immutable, keys that were overwritten or deleted may be reclaimed during the compaction process.

Figure 6:
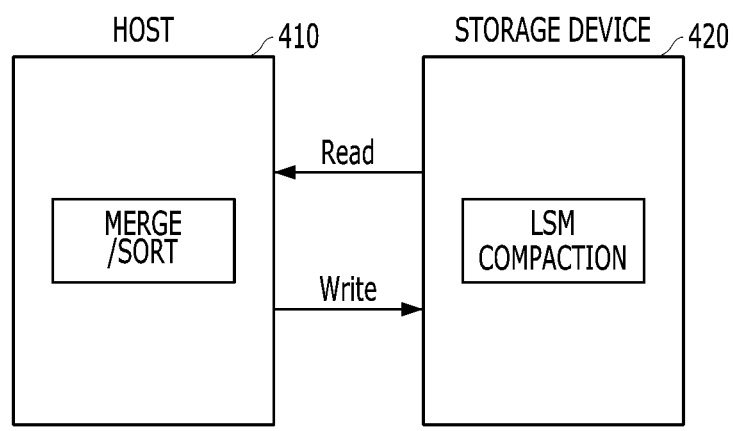
FIG. 6 illustrate a compaction process on an LSM tree.

As noted above, when the highest level L0 of LSM tree is full by data pieces flushed from the memory, a compaction process for LSM tree (which is called LSM compaction) is performed. That is, data pieces in the highest level L0 and one or more lower levels are merged and sorted through the compaction process, thereby deleting data pieces corresponding to an old (or formerly used) SSTable. For this LSM compaction, as shown in FIG. 6, the host 410 may read data from the storage device 420 and may merge and sort the read data. Then, the host 410 may write the merged and sorted data to the storage device 420. This process of the host writing merged and sorted data to the storage device may be performed repetitively, which may increase write amplification (WA) of the storage device 420, thereby reducing lifetime of the storage device 420.

Accordingly, embodiments of the present invention provide an LSM compaction scheme capable of avoiding write amplification of a storage device caused by the host repetitively writing merged and sorted data to the storage device.

Figure 7:
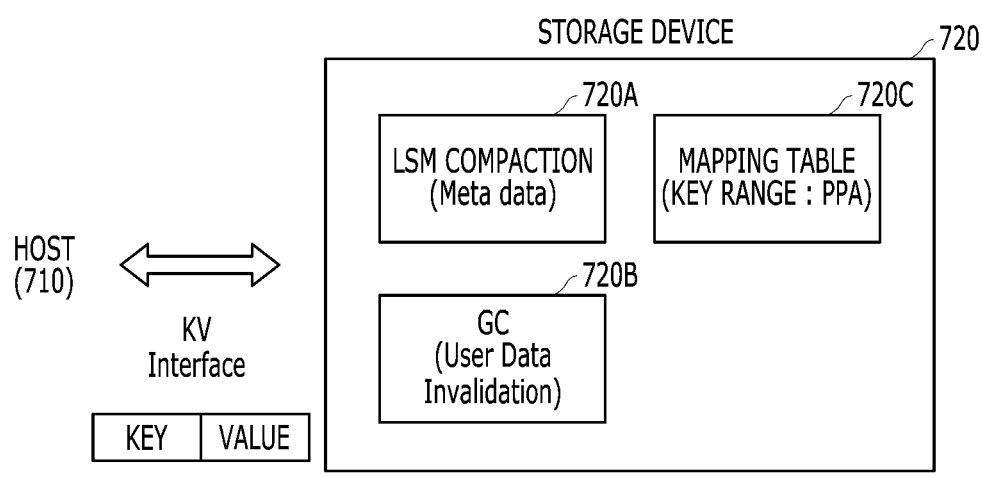
FIG. 7 illustrates a storage device with LSM compaction in accordance with still another embodiment of the present invention.

FIG. 7 illustrates a storage device 720 with LSM compaction in accordance with one embodiment of the present invention.

Referring to FIG. 7, embodiments of the present invention may remove read, merging and sorting and write of data by a host, which is necessary for a typical LSM compaction process. Instead, embodiments may provide a key-value (KV) interface between a host 710 and the storage device 720. In some embodiments of the present invention, the storage device 720 may be an x-level cell (xLC)-based solid state drive (SSD) being aware of a log structured merge (LSM) tree, which is called "LSM tree aware xLC SSD."

Figure 8:
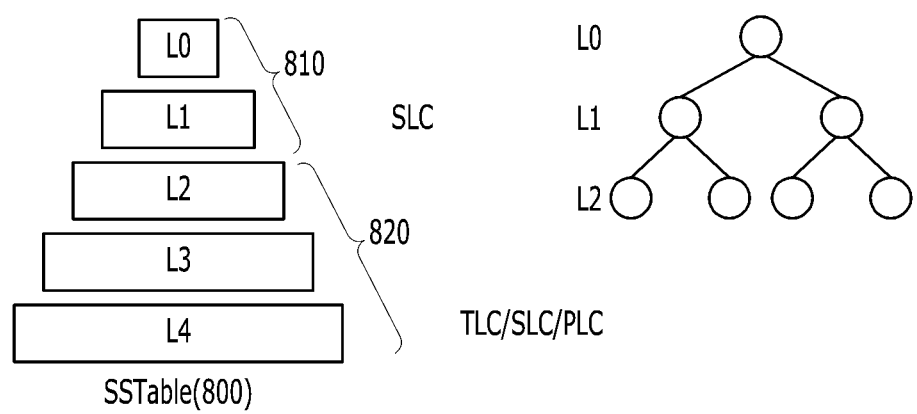
FIG. 8 illustrates a structure of an LSM tree in accordance with yet another embodiment of the present invention.

The LSM tree aware xLC SSD may support the LSM tree. That is, the storage device 720 may manage data in a form of a sorted string table (SSTable). The SSTable may include multiple levels in a hierarchical structure. In one embodiment as shown in FIG. 8, an SSTable 810 may include a first group level 810 and a second group level 820. The first group level 810 may include a highest level L0 and a higher level L1 adjacent to the highest level L0. The second group level 820 may include a lower level L2, a second lowest level L3 adjacent to the level L2 and a lowest level L4 adjacent to the level L3. As noted above, each level may have a set storage limit. While four levels are illustrated in SSTTable 800 in FIG. 8, a higher number of levels may be used. While two group levels are illustrated in SSTTable 800 in FIG. 8, a higher number of group levels may be used. In one embodiment, the highest level L0 has a storage limit less than that of the higher level L1, the higher level L1 has a storage limit less than that of the level L2, the level L2 has a storage limit less than that of the level L3, and the level L3 has a storage limit less than that of the level L4. For example, the level L1 may have a storage limit such that the maximum amount of data thereof will not exceed 10 MB, and the level L2 may have a storage limit such that the maximum amount of data thereof will not exceed 100 MB. In another embodiment, the first group level 810 may be implemented with single level cell (SLC) memory blocks, whereas the second group level 820 may be implemented with triple-level cell (TLC), quad-level cell (QLC) and/or penta-level cell (PLC) memory blocks. In another embodiment, the first group level 810 may be particular memory regions such as Zone or Namespace, whereas the second group level 820 may be other memory regions (i.e., Zone or Namespace).

Figure 11:
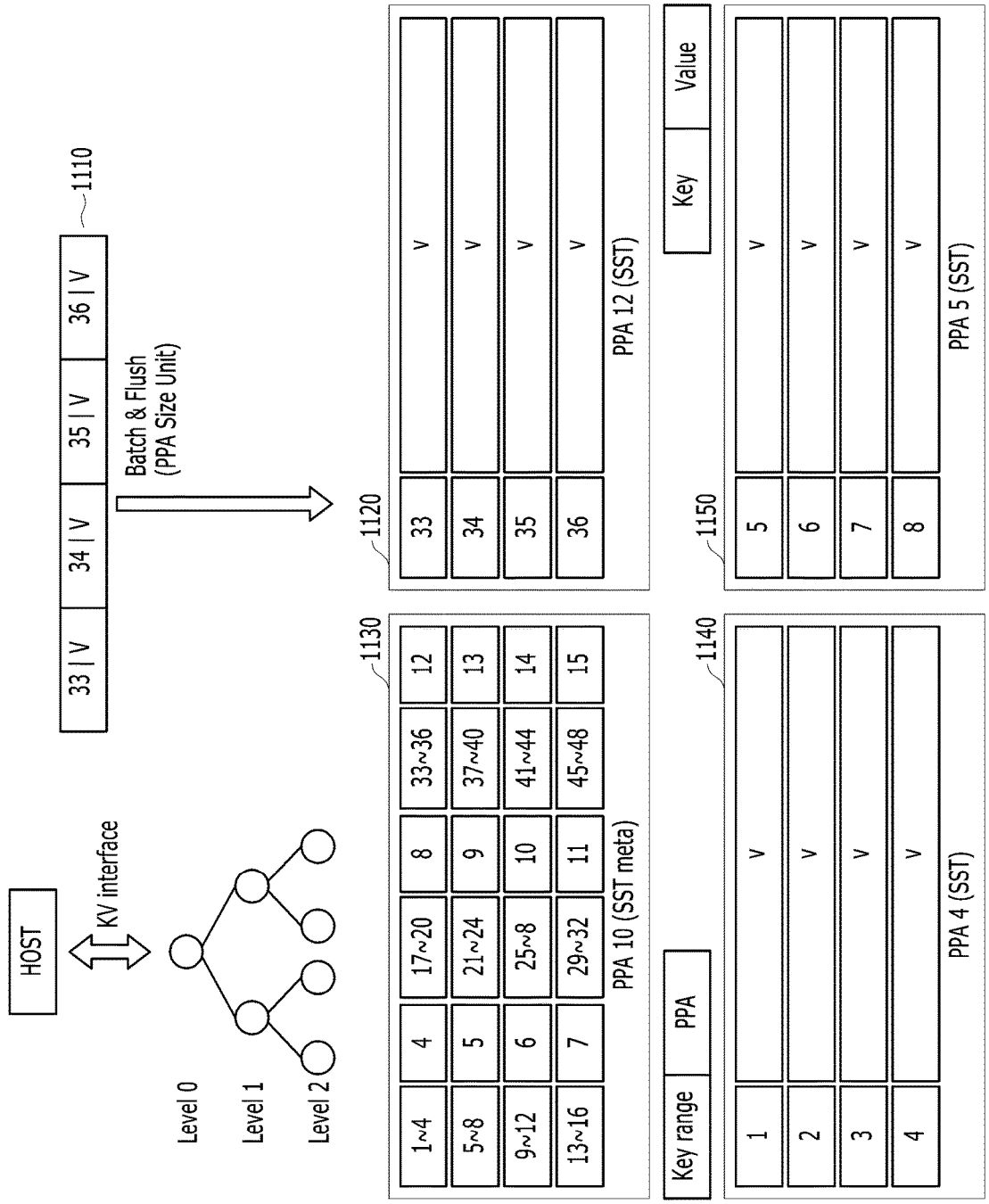
FIG. 11 illustrates an example of an operation of receiving of user data and storing of meta data in accordance with yet another embodiment of the present invention.
Figure 12:
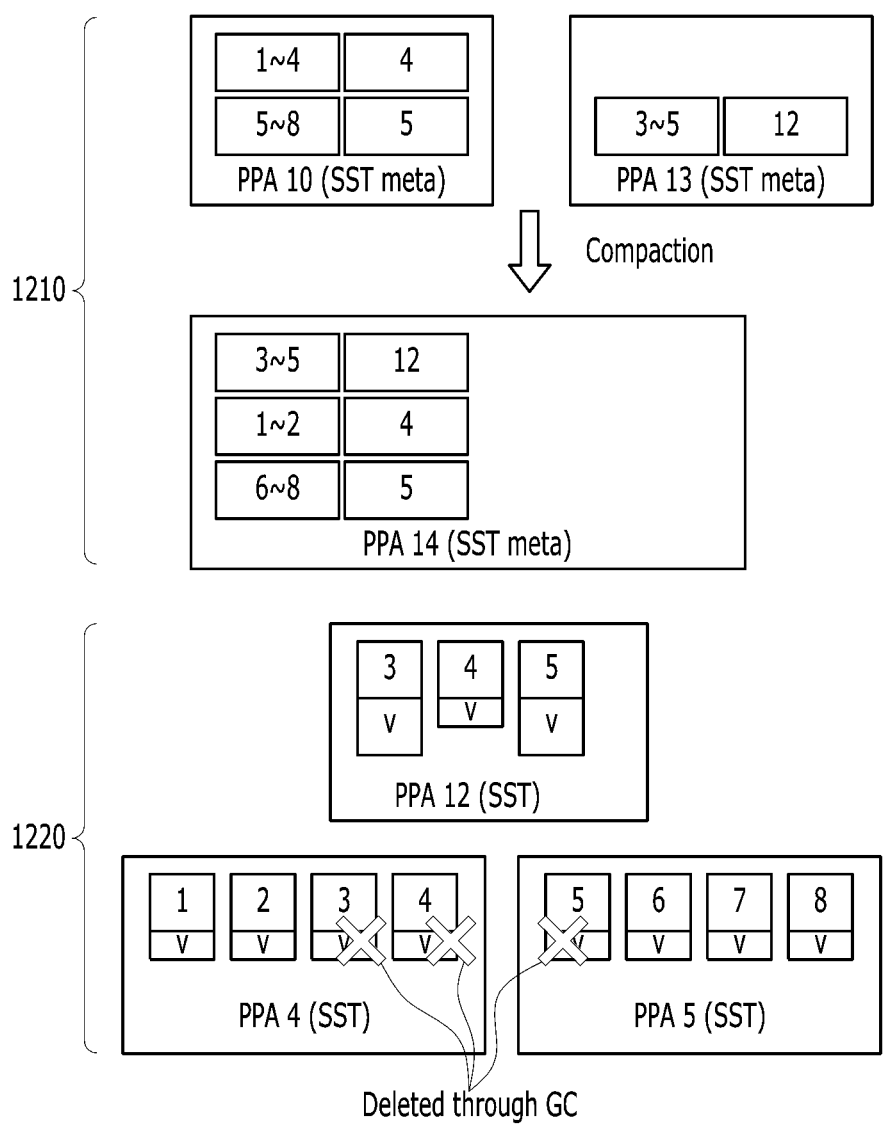
FIG. 12 illustrates an example of an operation of an LSM compaction and a garbage collection accordance with another embodiment of the present invention.

In one embodiment, the second group level 820 may store user data pieces, whereas the first group level 810 may store meta data pieces corresponding to the user data pieces. In another embodiment, the highest level L0 and a particular portion of the higher level L1 of the first group level 810 may store meta data pieces, whereas a remaining portion of the higher level L1 of the first group level 810 and levels L2-L4 of the second group level 820 may store user data pieces. In another embodiment, each of multiple meta data pieces and user data pieces may form an SSTable file as shown in FIGS. 11 and 12.

The storage device 720 may support an LSM compaction 720A which can avoid reading, merging and sorting of data by the host 710, thereby minimizing write amplification of the storage device 720. That is, in one embodiment, the storage device 720 may internally perform the LSM compaction without the cooperation of the host 710.

The storage device 720 may store user data in log form. In some embodiments, meta data including a key range and page physical address (PPA) information of user data may be defined. For example, SST meta in FIGS. 11 and 12 may indicate the defined meta data. That is, meta data piece may be information indicating a mapping relationship between a logical block address (LBA) and a PPA. The storage device 720 may use a mapping table 720C indicating a relationship between a key range and a PPA. Using the mapping table 720C may reduce overhead of a mapping table in comparison to a typical mapping table indicating a relationship between a key and an LBA and indicating a relationship between an LBA and a PPA. The storage device 720 may support an object-based key-value (KV) interface for a computational storage device (e.g., SSD). Through the KV interface, the storage device 720 may receive, from the host 720, a pair of a key (which as noted above uniquely identifies the record) and a value corresponding to the user data.

The LSM compaction 720A may be performed on meta data. Invalidated user data associated with the LSM compaction may be deleted through a garbage collection (GC) 720B.

In some embodiments, the LSM compaction 720A and the GC 720B may be performed by a processor of the storage device 720 (e.g., the control component 120 of FIG. 2). The mapping table 720C may be stored in a memory of the storage device 720 (e.g., the storage 110 of FIG. 2).

Figure 9:
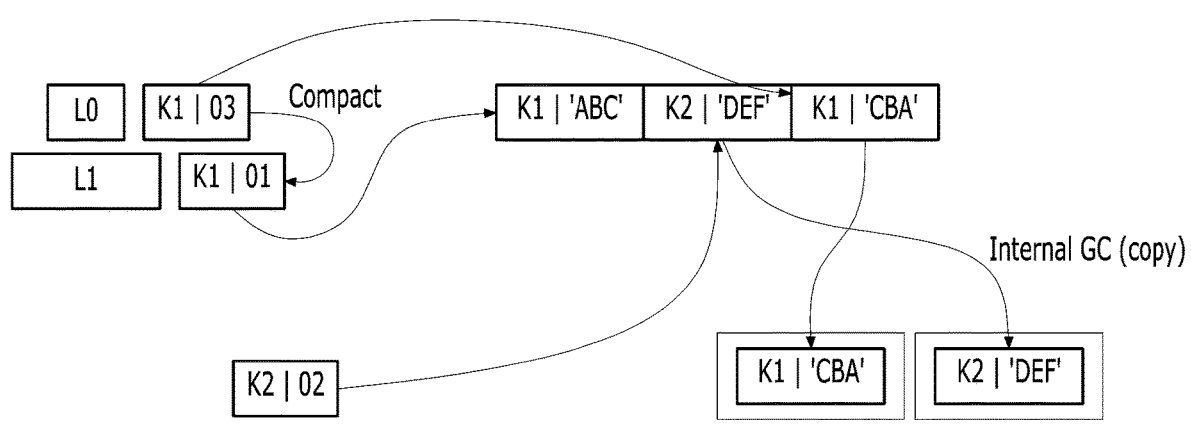
FIG. 9 illustrates an example of an LSM compaction in accordance with another embodiment of the present invention.

FIG. 9 illustrates an example of an LSM compaction in accordance with one embodiment of the present invention.

Referring to FIG. 9, a KV pair (K2, O2(=DEF)), a KV pair (K1, O1(=ABC)) and a KV pair (K1, O3(=CBA)) may be stored in different levels of an LSM tree. Here, "DEF" and "ABC" and "CBA" correspond to user data. For example, the KV pair (K1, O1) may be stored in a level L1 and the KV pair (K1, O3) may be stored in a highest level L0. Both the KV pair (K1, O1) and the KV pair (K1, O3) have an overlapping key value K1. Among the two KV pairs with the overlapping key value K1, the KV pair (K1, O3) is a recently received KV pair. Thus, when a new KV pair is received and is to be stored in the highest level L0, the LSM compaction may be triggered for the KV pair (K1, O1) and the KV pair (K1, O3). Through the LSM compaction on the KV pair (K1, O1) and the KV pair (K1, O3), the level L1 may be updated to have the KV pair (K1, O3(=CBA)) since the KV pair (K1, O3) is the recent KV pair. After the LSM compaction, the garbage collection may be performed such that the invalidated KV pair (K1, O1(=ABC)), i.e., the victim KV pair is deleted, and the KV pair (K1, O3(=CBA)) and the KV pair (K2, O2(=DEF)) are moved (copied) to free blocks.

Figure 10:
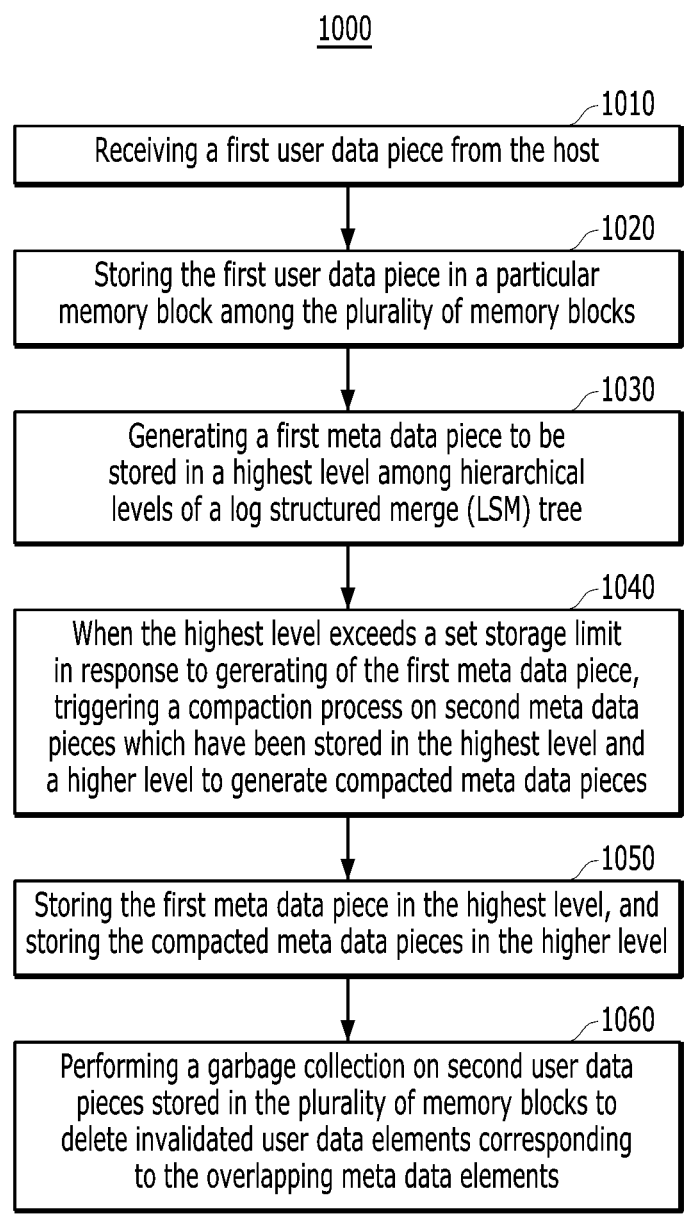
FIG. 10 is a flowchart illustrating an operation of a storage device with LSM compaction in accordance with still another embodiment of the present invention.

FIG. 10 is a flowchart illustrating an operation 1000 of a storage device with LSM compaction in accordance with still another embodiment of the present invention. The operation 1000 may be performed by the storage device 720 in FIG. 7. As noted above, the storage device 720 may include a plurality of memory blocks (e.g., memory blocks 211 of FIG. 2) and may be coupled to the host 710.

Referring to FIG. 10, at operation 1010, the storage device 720 may receive a first user data piece from the host 710. At operation 1020, the storage device 720 may store the first user data piece in a particular memory block among the plurality of memory blocks. In one embodiment, the first user data piece may be user data corresponding to a write request for storing data in the storage device 720 or a request for updating data stored in the storage device 720.

In the illustrated example of FIG. 11, the first user data piece may include 4 user data elements 1110 which correspond to one physical address (PPA) size unit. Four (4) user data elements may have a key range 33-36, i.e., key values 33-36. That is, each user data element may have a pair of a key and a value. The user data elements may be batched in a memory of the host 710, and then may be flushed to the storage device 720. Alternatively, the user data elements may be batched in a memory of the storage device 720, and then may be flushed to a disk region (i.e., SSTable) of the storage device 720.

In one embodiment, the first user data piece may be stored in a memory block of a particular level in a log structured merge (LSM) tree, which may be implemented with an SLC memory block. In the illustrated example of FIG. 11, the first user data piece may have the form as shown in data structure 1120, and may be stored in the highest level of LSM tree, i.e., Level 0 (L0) since the first user data piece is the most recently received user data. For example, the first user data piece may be an SST file corresponding to PPA 12.

At operation 1030, the storage device 720 may generate a first meta data piece corresponding to the first user data piece. In one embodiment, meta data piece may include a pair of a key range and a physical address (PPA). In the illustrated example of FIG. 11, the first meta data piece may include a pair of a key range (33~36) and a PPA 12. SST meta data 1130 represents meta data including the first meta data piece and may be stored in the highest level among hierarchical levels of LSM tree, i.e., Level 0 (L0). For example, the meta data may be SST meta data corresponding to PPA 10.

SST meta data may include multiple meta data pieces. In the illustrated example of FIG. 11, SST meta data 1130 may include twelve (12) meta data pieces, although the present invention is not limited to twelve (12) meta data pieces. Each meta data piece may correspond to a user data piece. For example, meta data piece [(1~4), 4] corresponds to user data piece (SST file) 1140 with PPA 4, and meta data piece [(5~8), 5] corresponds to user data piece (SST file) 1150 with PPA 5. In one embodiment, SST meta data 1130 may be stored in the highest level L0 of LSM tree. In another embodiment, SST meta data 1130 may be stored in the highest level L0 and may be additionally in the higher level L1.

At operation 1040, when the highest level exceeds a set storage limit in response to generating of the first meta data piece, the storage device 720 may trigger an LSM compaction process. In one embodiment, the LSM compaction process may be performed on the first meta data piece and second meta data pieces among remaining meta data pieces of SST meta data 1130. As noted above, remaining meta data pieces may have been stored in the highest level L0 and/or the higher level L1. Compacted meta data pieces may be generated through the LSM compaction process on the first meta data piece and the second meta data pieces.

In one embodiment, the second meta data pieces may include overlapping meta data elements overlapped with the first meta data piece, and the compacted meta data pieces may exclude the overlapping meta data elements. In the illustrated example of FIG. 12, the operation at 1210 represents the LSM compaction process. A new meta data piece corresponding to a new user data piece may be generated. For example, SST meta data with PPA 13 [(3-5), 12] may be generated. The new meta data piece may have three (3) meta data elements within a PPA size unit, or may have four (4) meta data elements. The new meta data piece is overlapped with meta data elements of SST meta data piece with PPA 10. That is, three (3) meta data elements (3~5) of the new meta data piece are overlapped with a) elements (3~4) of a meta data piece [(1~4), 4] and b) an element (5) of a meta data piece [(5~8), 5] in SST meta data with PPA 10. The LSM compaction process 1210 may generate compacted meta data pieces by merging SST meta data with PPA 13 [(3-5), 12] and SST meta data with PPA 10 {[(1~4), 4] and [(5~8), 5]}, thereby excluding the overlapping meta data elements {[(3~4), 4] and [5, 5]} of SST meta data with PPA 10 to generate resultant SST meta data pieces and sorting the SST meta data with PPA 13 [(3-5), 12] and the resultant SST meta data with PPA 10.

At operation 1050, the storage device 720 may store the compacted meta data pieces in the highest level L0 of the LSM tree. In the illustrated example of FIG. 12, the compacted meta data pieces may be stored in PPA 14 corresponding to the highest level L0.

At operation 1060, the storage device 720 may perform a garbage collection (GC) on second user data pieces stored in the plurality of memory blocks to delete invalidated user data elements corresponding to the overlapping meta data elements. In the illustrated example of FIG. 12, the operation at 1220 represents a garbage collection process on the second user data pieces with PPA 4 and PPA 5. As noted above, the overlapping meta data elements {[(3~4), 4] and [5, 5]} of SST meta data with PPA 10 are excluded and invalidated through the LSM compaction process 1210. The GC process 1220 may be performed on user data pieces corresponding to SST meta data with PPA 10, i.e., SST with PPA 4 and SST with PPA 5. Through the GC process 1220, victim user data pieces may be determined and the determined victim user data pieces may be deleted. That is, victim user data pieces corresponding to the overlapping meta data elements {[(3~4), 4] and [5, 5]} of SST meta data with PPA 10 may be deleted. Further, the GC process 1220 may move, to free blocks, remaining user data pieces corresponding to the compacted meta data pieces.

As described above, embodiments of the present disclosure provide an inventive LSM compaction scheme capable of avoiding repetitive processes by a host such as reading data from a storage device, merging and sorting on the read data, and writing sorted data to the storage device. Thus, embodiments of the present invention may reduce write amplification of the storage device by performing compaction on meta data and avoiding compaction on user data and the repetitive processes by the host.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the disclosure. Furthermore, the embodiments may be combined to form additional embodiments.

What is claimed is:

1. A system comprising:
   a host; and
   a storage device including a plurality of memory blocks, coupled to the host and configured to:
   receive a first user data piece from the host;
   store the first user data piece in a particular memory block among the plurality of memory blocks;
   generate a first meta data piece to be stored in a highest level among hierarchical levels of a log structured merge (LSM) tree, the first meta data piece corresponding to the first user data piece;
   when the highest level exceeds a set storage limit in response to determining of the first meta data piece, trigger a compaction process on the first meta data piece and second meta data pieces which have been stored in the highest level and a higher level to generate compacted meta data pieces, the second meta data pieces including overlapping meta data elements overlapped with the first meta data piece, the compacted meta data pieces excluding the overlapping meta data elements;
   store the compacted meta data pieces in the highest level; and
   perform a garbage collection on second user data pieces stored in the plurality of memory blocks to delete victim user data elements corresponding to the overlapping meta data elements, the second user data pieces corresponding to the second meta data pieces.

2. The system of claim 1, wherein the compaction process includes:
   merging the first meta data piece and the second meta data pieces;
   excluding the overlapping meta data elements of the second meta data pieces to generate resultant meta data pieces; and
   sorting the first meta data piece and the resultant meta data pieces to generate the compacted meta data pieces.

3. The system of claim 1, wherein each meta data piece includes a pair of a key range and a physical address (PPA).

4. The system of claim 1, wherein the LSM tree includes the highest level, the higher level adjacent to the highest level and one or more lower levels adjacent to the higher level.

5. The system of claim 4, wherein the highest level has a storage limit less than that of the higher level, and the higher level has a storage limit less than that of each lower level.

6. The system of claim 4, wherein the highest level and the higher level include a single level cell (SLC).

7. The system of claim 6, wherein each of the one or more lower levels has a storage limit less than a storage limit of each of the highest level and the higher level.

8. The system of claim 7, wherein the second user data pieces are stored in the one or more lower levels.

9. The system of claim 1, wherein the controller performs the garbage collection such that the compacted meta data pieces are moved to free blocks and the victim user data elements are deleted.

10. A method for operating a storage device including a plurality of memory blocks and coupled to a host, the method comprising:
   receiving a first user data piece from the host;
   storing the first user data piece in a particular memory block among the plurality of memory blocks;
   generating a first meta data piece to be stored in a highest level among hierarchical levels of a log structured merge (LSM) tree, the first meta data piece corresponding to the first user data piece;
   when the highest level exceeds a set storage limit in response to determining of the first meta data piece, triggering a compaction process on the first meta data piece and second meta data pieces which have been stored in the highest level and a higher level to generate compacted meta data pieces, the second meta data pieces including overlapping meta data elements overlapped with the first meta data piece, the compacted meta data pieces excluding the overlapping meta data elements;
   storing the compacted meta data pieces in the highest level; and
   performing a garbage collection on second user data pieces stored in the plurality of memory blocks to delete victim user data elements corresponding to the overlapping meta data elements, the second user data pieces corresponding to the second meta data pieces.

11. The method of claim 10, wherein the compaction process includes:
merging the first meta data piece and the second meta data pieces;
excluding the overlapping meta data elements of the second meta data pieces to generate resultant meta data pieces; and
sorting the first meta data piece and the resultant meta data pieces to generate the compacted meta data pieces.

12. The method of claim 10, wherein each meta data piece includes a pair of a key range and a physical address (PPA).

13. The method of claim 10, wherein the LSM tree includes the highest level, the higher level adjacent to the highest level and one or more lower levels adjacent to the higher level.

14. The method of claim 13, wherein the highest level has a storage limit less than that of the higher level, and the higher level has a storage limit less than that of each lower level.

15. The method of claim 13, wherein the highest level and the higher level include a single level cell (SLC).

16. The method of claim 15, wherein each of the one or more lower levels has a storage limit less than a storage limit of each of the highest level and the higher level.

17. The method of claim 16, wherein the second user data pieces are stored in the one or more lower levels.

18. The method of claim 10, wherein the performing the garbage collection includes: moving the compacted meta data pieces to free blocks and deleting the victim user data elements.

19. A method for operating a storage device including a plurality of memory blocks and coupled to a host, the method comprising:
receiving a first user data piece from the host;
storing the first user data piece in a particular memory block among the plurality of memory blocks;
generating a first meta data piece to be stored in a highest level among hierarchical levels of a log structured merge (LSM) tree, the first meta data piece corresponding to the first user data piece; and
to avoid compaction of data by the host, performing a compaction process in the storage device on the first meta data piece and second meta data pieces which have been stored in the highest level and a higher level to generate compacted meta data pieces, the second meta data pieces including overlapping meta data elements overlapped with the first meta data piece, the compacted meta data pieces excluding the overlapping meta data elements.

20. The method of claim 19, wherein the compaction process occurs without cooperation of the host.

* * * * *